United States Patent [19]

Melville et al.

[11] Patent Number: 5,338,354
[45] Date of Patent: Aug. 16, 1994

[54] COMPOSITE PIGMENTARY MATERIAL

[75] Inventors: Iain A. Melville, Cleveland, England; Robert P. Rauch, deceased, late of Cleveland, England, by Micheline M. E. Rauch, Patrick A. Rauch and Stephen E. Rauch, administrators

[73] Assignee: Tioxide Group Services Limited, London, England

[21] Appl. No.: 80,007

[22] Filed: Jun. 23, 1993

[30] Foreign Application Priority Data

Jun. 24, 1992 [GB] United Kingdom ............. 9213454.3

[51] Int. Cl.$^5$ ............................................. C09C 1/36
[52] U.S. Cl. ................... 106/442; 106/449; 106/446; 106/464
[58] Field of Search ............... 106/449, 461, 442, 446, 106/464

[56] References Cited

U.S. PATENT DOCUMENTS 3,726,700  4/1973  Wildt ................... 106/300

FOREIGN PATENT DOCUMENTS 3511945  10/1987  Fed. Rep. of Germany .
73043173  7/1970  Japan .
8406073  6/1985  Sweden .
930363  7/1963  United Kingdom .
1254949  11/1971  United Kingdom .
1336292  11/1973  United Kingdom .
1349089  3/1974  United Kingdom .
1532521  11/1978  United Kingdom .
2226017  6/1990  United Kingdom .
2234990  2/1991  United Kingdom .

*Primary Examiner*—Karl Group
*Assistant Examiner*—Chris Gallo
*Attorney, Agent, or Firm*—Baker & Botts

[57] ABSTRACT

A new process for preparing a composite pigment from titanium dioxide and calcium sulphate is provided in which the calcium sulphate is milled to a particle size less than 10 microns, mixed with titanium dioxide and the mixed particulates are coated with an oxide or hydrous oxide of a metal or silicon. The process can particularly be employed in conjunction with a sulphate-process titanium dioxide plant in which by-product sulphuric acid is converted to gypsum. The composite pigment shows improved optical properties in comparison to a mixture of titanium dioxide and gypsum.

20 Claims, No Drawings

COMPOSITE PIGMENTARY MATERIAL

This invention relates to a composite pigmentary material and in particular to the preparation of a composite pigmentary material from titanium dioxide and calcium sulphate.

Composite pigments which comprise a mixture of titanium dioxide and a pigment spacer and in which a coating is formed on the mixed particles are known. Such pigments have better optical properties than an uncoated mixture of extender and titanium dioxide.

It is an object of this invention to provide an economical method for preparing such a composite pigment having good optical properties.

According to the invention a process for preparing a composite pigment comprises forming an aqueous dispersion of particulate calcium sulphate, milling said dispersion to reduce the average particle size of the calcium sulphate to less than 10 micron, mixing the milled calcium sulphate with pigmentary titanium dioxide to form an aqueous dispersion of mixed particles of titanium dioxide and calcium sulphate and coating the mixed particles with an oxide or hydrous oxide of a metal or silicon.

The calcium sulphate used in the process of the invention is usually a hydrated calcium sulphate and is preferably gypsum. It is convenient to use gypsum which has been prepared by neutralisation of sulphuric acid generated as a by-product in the so-called "sulphate" process for preparing titanium dioxide. Typically the by-product sulphuric acid is mixed with a calcium compound such as calcium hydroxide or calcium carbonate to precipitate the gypsum. Preferably, this precipitation is carried out at a pH below about 1.15 since the use of this low pH minimises co-precipitation of impurities in the by-product sulphuric acid such as iron salts which give rise to undesirable colour in the gypsum. The gypsum is separated, for example by filtration, and usually washed on the filter to remove most of the impurities present. Preferably, the filter cake is washed with a solution of a water-soluble phosphate such as monoammonium phosphate since this wash helps to improve the colour of the gypsum. The phosphate wash has a more marked effect on the colour of the calcium sulphate if the gypsum is subsequently converted to anhydrite. Treatment of the gypsum with the phosphate at other stages during its manufacture can also improve the final colour of the gypsum but generally treatment on the filter is the most efficient treatment.

The particle size of gypsum produced from by-product sulphuric acid is usually too large for the gypsum to act efficiently as a pigment spacer. For example, in a typical product more than 50% by weight has a particle size greater than 35 microns.

In the process of the invention the average particle size of the calcium sulphate is reduced by subjecting a dispersion of the particles to a milling process. Any suitable form of milling such as ball milling or impact milling can be used but preferably the calcium sulphate is milled using a sand mill such as is frequently used in the pigment industry. A calcium sulphate dispersion is mixed with sand particles and the mixture is passed through a milling zone where it is agitated by, for example, a series of discs mounted upon a rotating shaft. The sand particles act as a grinding medium and reduce the particle size of the calcium sulphate.

The dispersion of calcium sulphate is formed by stirring the particulate calcium sulphate with water preferably in the presence of a dispersing agent. A number of dispersing agents including phosphates such as sodium hexametaphosphate, and silicates such as sodium silicate can be used but preferably the dispersing agent is an alkanolamine or a salt of a polycarboxylic acid and an alkali metal. The preferred alkanolamine dispersing agent is monoisopropanolamine and the preferred acid salt is a sodium polycarboxylate.

The average particle size of the calcium sulphate is reduced by milling to less than 10 microns. Preferably, the average particle size is reduced to less than 5 microns and commercially useful composite pigments can be formed from calcium sulphate the average particle size of which has been reduced to between 3 and 5 microns. In this invention the term "particle size" is used to describe the particle size as measured by a Malvern Mastersizer.

The milled calcium sulphate is mixed with pigmentary titanium dioxide. The titanium dioxide can be produced by any suitable process such as the so-called "chloride" process or the "sulphate" process but conveniently the sulphate process provides a source of both the calcium sulphate and the titanium dioxide used in the process of this invention. In the "sulphate" process a titaniferous ore is digested with concentrated sulphuric acid and the digestion cake dissolved in water or dilute acid to produce a solution of titanyl sulphate. Usually this titanyl sulphate solution is treated by classification and reduction before hydrolysis to precipitate hydrous titania. Soluble iron compounds remain in solution and are removed by filtration and washing of the precipitated hydrous titania. Usually the hydrous titania is then calcined to dry the product and convert it to titanium dioxide. After calcination the titanium dioxide is normally milled to break up any aggregates which have been formed. Milling is accomplished, for example, in a sand mill as described hereinbefore.

The output from a sand mill is pigmentary grade titanium dioxide in the form of a dispersion and this provides an eminently suitable form of titanium dioxide for use in the process of this invention. This dispersion can be mixed with the dispersion of calcium sulphate described hereinbefore to provide a dispersion of mixed particles of titanium dioxide and calcium sulphate.

Usually titanium dioxide intended for use as a pigment is provided with one or more inorganic and/or organic coatings to improve its performance. Titanium dioxide which has been so treated may be used in the process of this invention although no benefit will normally be obtained since the composite pigments of the invention are provided with a further coating. For economical reasons, therefore, it is preferred to employ an uncoated titanium dioxide.

The titanium dioxide used in the process of the invention can be in any crystal form but is preferably rutile titanium dioxide and preferably has an average crystal size of from about 0.1 to about 0.4 micron. Most preferably the average crystal size is between 0.2 and 0.3 micron.

The proportions of titanium dioxide and calcium sulphate in the composite pigment prepared according to the invention can be varied quite widely depending upon the intended use for the pigment. However, it has been found that the balance between cost and optical performance can be optimised in a pigment containing from about 1% to about 70% by weight of titanium dioxide calculated with respect to total weight of titanium dioxide and calcium sulphate. Preferably the proportion of titanium dioxide is from 10 to 50% by weight and most preferably it is from 25 to 40% by weight.

The dispersion of mixed particles can be formed by adding solid titanium dioxide to the dispersion of calcium sulphate which results from the milling step of the process of the invention but it may also be formed as hereinbefore indicated by mixing a dispersion of titanium dioxide with the calcium sulphate dispersion. Alternatively, when a process in which both the titanium dioxide and the calcium sulphate are milled is employed, it is convenient to simultaneously mill a mixture of calcium sulphate and titanium dioxide in the desired proportions.

The concentration of the dispersion during milling is chosen so as to achieve efficient milling and will vary depending upon the type and size of mill employed and the particular dispersing agent used. The dispersion may contain up to 700 grams per liter total solids and typically contains from 100 to 400 grams per liter total solids. The process of the invention has been shown to operate very satisfactorily when concentrations between 125 and 250 grams per liter total solids are employed.

If necessary, a dispersing agent such as monoisopropanolamine, sodium hexametaphosphate or sodium silicate may be added to improve the degree of dispersion.

The particles of the dispersion are coated in the process of this invention with one or more oxides or hydrous oxides and typically the coating may be of one or more oxides or hydrous oxides of titanium, aluminium, silicon, cerium, zirconium, zinc, antimony or tin. The coating of oxides or hydrous oxides can be present within a wide range of amounts and can be up to 35% by weight of the coating as oxides on weight of particulate material. More usually amounts of oxide or hydrous oxide in the range 1% to 25% by weight as oxide, preferably 2.5% to 20%, are present based on the weight of the particulate material. Mixed coatings of two or more different oxides or hydrous oxides can be present either as a homogeneous mixture or as separate coatings. Particularly useful products are obtained when a coating including both a hydrous oxide of titanium and a hydrous oxide of aluminium or a coating including both a hydrous oxide of silicon and a hydrous oxide of aluminium is employed.

The coating of the particulate mixture is effected usually by mixing the aqueous dispersion of the mixed particles with a hydrolysable compound of the desired metal or of silicon and hydrolysing the compound to deposit the chosen oxide or oxides usually in a hydrous form. The hydrolysable compound can be one which is acidic or alkaline in character, usually acidic, which is hydrolysed on neutralisation or rendering alkaline or acid as is appropriate.

Coating of pigments can be carried out by a number of different techniques depending on the acidity or alkalinity of the initial aqueous dispersion to be coated and of the particular hydrolysable compounds used. Usually when acidic hydrolysable compounds are added to an aqueous dispersion of particulate mixture the hydrolysis and precipitation of the coating is effected by subsequently adding an alkali or base to change the pH of the dispersion. When the hydrolysable compound is alkaline in nature then hydrolysis and precipitation can be effected by adding an acid or by adding an acidic hydrolysable compound. Many different techniques can be used as appropriate. Alternative methods of coating such as co-addition of acidic and alkaline reacting hydrolysable compounds, simultaneous addition of one or more hydrolysable compounds and an acid or an alkali can be used also.

Typically the water soluble hydrolysable compound is, in the case of a metal compound, a salt such as a halide or the salt of a mineral acid. When the coating formed by the process contains an oxide or hydrous oxide of silicon then this may be deposited from an alkali metal silicate such as sodium silicate. When the coating is to include oxides or hydrous oxides of titanium and of aluminium then a mixed solution of titanyl sulphate and aluminium sulphate can be used. Alkali metal aluminates can be used as the source of an oxide or hydrous oxide of aluminium, if desired.

After precipitation of the coating of oxide or hydrous oxide the composite pigment is separated by, for example, filtration, washed to remove soluble salts remaining from the coating process and dried. The amount of washing used should be sufficient to efficiently remove the unwanted soluble salts from the coating process but it is desirable to minimise dissolution of calcium sulphate which is slightly soluble in water. The pigment is conveniently dried using a band dryer or spray dryer. If required, the dried pigment is micronised to break up any aggregates formed during the drying.

If desired, a composite pigmentary material containing anhydrite can be produced by heating a composite material containing gypsum to a temperature of about 650° C. for sufficient time to dehydrate the gypsum.

The composite pigment prepared according to the process of the invention shows improved optical properties when used in a coating composition in comparison to a mixture of titanium dioxide and gypsum. It is believed that this improvement is brought about by the structure of the composite pigment which provides a uniform spacing between titanium dioxide particles in the dried coating film.

The invention is illustrated by the following examples.

EXAMPLE 1

Gypsum which had been prepared by the neutralisation of waste acid from the sulphate process for the manufacture of titanium dioxide pigment and which had been washed with a solution of monoammonium phosphate was slurried with water to give a concentration of 250 g/l. The gypsum had a size distribution such that 50% of the particles were larger than 35 microns. A quantity of monoisopropanolamine (MIPA) was added to the slurry to give a concentration of 0.3% MIPA based on the dry weight of gypsum. The gypsum slurry was then passed through a sand mill and the particle size was reduced so that 50% of the particles were smaller than 10 microns. The milled slurry was then diluted to 210 g/l.

A sample of a slurry of titanium dioxide was taken from the discharge point of a sand mill being used to produce titanium dioxide pigment. The titanium dioxide slurry contained 0.3% MIPA based on titanium dioxide and it was diluted with water to give a solids content of 210 g/l.

The slurries of gypsum and titanium dioxide were blended so as to obtain a slurry containing a ratio of 30:70 parts by weight titanium dioxide to gypsum and the mixed slurry was stirred for 30 minutes to ensure good mixing. During mixing the slurry was heated to 50° C. and maintained at this temperature during the following coating process.

A titania/alumina coating was applied by adding firstly a titanium aluminium sulphate solution having a specific gravity of 1.30 and containing the equivalent of 50 g/l $TiO_2$ and 75 g/l $Al_2O_3$, mixing for 30 minutes and then adding a caustic sodium aluminate solution having a specific gravity of 1.30 and containing the equivalent of 95 g/l $Al_2O_3$ over the next 30 minutes. Each addition was made to give 1.4% alumina (2.8% alumina in total) based on the total solids in the slurry. After completion of the caustic sodium aluminate addition the pH of the mixture was adjusted to 10.3 using a solution of sodium hydroxide. The mixture was stirred for 30 minutes and the pH was then adjusted to 7.5 by adding dilute sulphuric acid. The mixture was stirred for a further 60 minutes whilst the pH was maintained at 7.5.

The composite pigment was separated by filtration and washed on the filter to give filter cake containing approximately 500 g/l pigment. This filter cake was partially dried on a dewatering filter and finally dried on a band dryer at 120° C. with a residence time of 30 minutes before micronising to produce a fine powder.

The composite pigment produced according to the above example was used to prepare an emulsion paint with a pigment volume concentration (pvc) of 65% and this paint was found to have a better contrast ratio than a control paint containing the same amount of titanium dioxide pigment at the same pvc.

Examination of the paints under a scanning electron microscope showed that the spacing of the titanium dioxide particles in the paint film containing composite pigment was more uniform than in the control paint film.

EXAMPLE 2

A comparison was made between three composite pigments and a mixture of a commercial titanium dioxide pigment and extenders. All of the composite pigments were prepared using gypsum produced by neutralisation of sulphuric acid. The average particle size of the gypsum was 30 micron.

The first composite pigment of the series (CP-A) was prepared by blending the slurried gypsum with a slurry of milled titanium dioxide pigment in a weight ratio of 30 parts milled titanium dioxide pigment to 70 parts gypsum. A composite pigment was made from the blended slurry by co-coating the titanium dioxide pigment and gypsum with an inorganic coating of titania/alumina using the method described in Example 1. The coating level was sufficient to give a coating of 2.8% $Al_2O_3$ by weight in total.

The second composite pigment of the series (CP-B) was prepared using the same gypsum as starting material, but in this case the gypsum was milled in a sand mill at a concentration of 400 grams per liter in the presence of 0.3% (by weight on gypsum) monoisopropanolamine to reduce the average particle size to 5 micron. The milled gypsum slurry was then blended with milled titanium dioxide pigment slurry in the same 70:30 ratio as above and co-coated in the same way with a titania/alumina inorganic coating.

For the third composite pigment in this series (CP-C), the same gypsum starting material was slurried with titanium dioxide pigment, again in the same 70:30 ratio, and the two starting materials milled together in a sand mill at a total solids concentration of 490 grams per liter, using monoisopropanolamine as a dispersant at a concentration of 0.3% by weight based on solids. After milling the composite pigment was prepared by co-coating with the same inorganic coating as was applied to the first two composite pigments.

After coating all three composite pigments were washed on a filter to give a filter cake containing approximately 500 grams per liter pigment, dried at 60° C. overnight and micronised. Each of the pigments was used, in conjunction with a blend of extenders, to make an emulsion paint at a total pigment volume concentration of 65% with a titanium dioxide pigment volume concentration of 9.2%. As a control a fourth paint was prepared using a commercial titanium dioxide pigment and the same blend of extenders to make an emulsion paint with the same pigment volume concentration and the same titanium dioxide pigment volume concentration. The paints were assessed by measuring contrast ratio (CR) and reflectance over black ($Y_b$) at 25 micron dry film thickness. The results obtained are shown in Table 1.

TABLE 1

| Pigmentation | CR (25 micron) | Yb (25 micron) |
|---|---|---|
| CP-A | 93.1% | 80.7 |
| CP-B | 93.8% | 82.4 |
| CP-C | 94.8% | 82.3 |
| Commercial pigment | 92.9% | 80.0 |

EXAMPLE 3

A series of composite pigments was prepared in which the proportion of titanium dioxide varied from approximately 30% to approximately 50% by weight. The composite pigments were prepared by separately milling a slurry of gypsum at a concentration of 200 grams per liter and a slurry of titanium dioxide at a concentration of 700 grams per liter as described in Example 1. The two slurries were blended in appropriate ratios and diluted to give slurries having a total solids content of 180 grams per liter. A titania/alumina coating at a level of 2.8% $Al_2O_3$ by weight was then precipitated as in Example 1.

The composite pigments were then evaluated in an emulsion paint formulation, at a total pigment volume concentration of 65% and a titanium dioxide pigment volume concentration of 10.8%. Each of the paints was drawn down alongside a control prepared from a commercial titanium dioxide pigment, having the same titanium dioxide pigment volume concentration and the same total pigment volume concentration. The drawdowns were made with a wet film thickness of 60 micron and, when dry, were used to measure contrast ratio (CR). The titanium dioxide pigment content of the composite pigments, and the results of the contrast ratio measurements, are shown in Table 2. The results for the control were averaged over the series.

TABLE 2

| Titanium dioxide pigment content of composite pigment | CR for dry films prepared from 60 micron wet film drawdowns |
|---|---|
| 48.7 | 88.3% |
| 40.5 | 88.2% |
| 35.7 | 89.3% |
| 35.2 | 88.0% |
| 32.4 | 88.9% |
| 30.9 | 88.1% |
| Control | 87.4% |

EXAMPLE 4

A series of composite pigments were prepared in which various inorganic coatings were applied.

Gypsum which had been prepared by neutralisation of by-product sulphuric acid from the preparation of titanium dioxide pigment was finally washed with monoammonium phosphate to give a 0.3% by weight addition level of monoammonium phosphate.

The gypsum was milled on a sand mill at a concentration of 400 grams per liter using 0.3% by weight monoisopropanolamine as a dispersant based on gypsum to reduce the average particle size to 5 micron. A mixed slurry containing this gypsum and titanium dioxide which had been sand-milled at 700 grams per liter as in Example 1 in a ratio of 70 parts gypsum to 30 parts titanium dioxide by weight was prepared and diluted to a total solids concentration of 210 grams per liter. A titania/alumina coating was deposited on the particles of the slurry at an $Al_2O_3$ level of 2.8% by weight (pigment CP-D) using the method of Example 1.

A slurry of the same gypsum at a concentration of 400 grams per liter with a 1.0% by weight (on gypsum) of sodium silicate as dispersant was milled in a sand mill to an average particle size of 5 microns. This was blended with a pigmentary titanium dioxide slurry which had been milled at a concentration of 700 grams per liter in the presence of 1.0% by weight sodium silicate on titanium dioxide. The weight ratio of gypsum to titanium dioxide was 70:30 and the total solids content for the mixed slurry was adjusted to 230 grams per liter.

The mixed slurry was heated to 45° C. and held at that temperature during the following coating process. Titanium aluminium sulphate solution containing the equivalent of 40 g/l $TiO_2$, 75 g/l $Al_2O_3$ and 315 g/l $H_2SO_4$ was added in sufficient quantity to precipitate 0.6% $Al_2O_3$ with respect to total solids. After stirring for 20 minutes caustic sodium aluminate containing the equivalent of 85 g/l $Al_2O_3$ and 230 g/l NaOH was added over 15 minutes in sufficient quantity to precipitate 1.0% $Al_2O_3$ by weight with respect to total solids. Sufficient sodium silicate solution (150 g/l $Na_2SiO_3$) to precipitate 4.0% $SiO_2$ by weight with respect to total solids was added and the slurry was mixed for 45 minutes. A further 0.9% $Al_2O_3$ with respect to total solids was then precipitated by the addition of aluminium sulphate solution containing the equivalent of 90 g/l $Al_2O_3$ and 270 g/l $H_2SO_4$. After mixing for 20 minutes the pH of the slurry was adjusted to 5.3 to 5.5 and the stirring was continued for a further 30 minutes. The resulting composite pigment was designated CP-E.

A similar composite pigment (designated CP-F) which was coated with a higher level of silica and alumina was prepared by a process similar to that used for pigment CP-E except that the first alumina addition was equivalent to 1.2% $Al_2O_3$, the second alumina addition was equivalent to 2.1% $Al_2O_3$, the silica addition was equivalent to 9.0% $SiO_2$ and the third alumina addition was equivalent to 1.7% $Al_2O_3$ based on total solids.

A further composite pigment was prepared in a manner similar to that used for CP-D but the gypsum used had not been treated with monoammonium phosphate. The pigment sample was designated CP-G.

After coating the composite pigments were filtered, washed, dried and micronised as in Example 2.

The composite pigments were used to prepare paints at 74% total pigment volume concentration and a titanium dioxide pigment volume concentration of 7.5%.

As controls paints were prepared using two commercial titanium dioxide pigments, one with a titania/alumina coating and the other a grade heavily coated with alumina/silica. Both controls were made to the same titanium dioxide pigment volume concentration and the same total pigment volume concentration as the paints containing the composite pigments. Additional filler was used in the paint composition to compensate for the gypsum of the composite pigments. Drawdowns were made for each paint in the series and measurements of contrast ratio (CR) and reflectance over black ($Y_b$) were made at 25 micron dry film thickness. The results of these measurements are shown in Table 3.

TABLE 3

| Test Pigment | CR at 25 microns | $Y_b$ at 25 microns |
|---|---|---|
| CP-D | 96.8% | 85.2 |
| CP-E | 97.3% | 83.4 |
| CP-F | 97.3% | 86.0 |
| CP-G | 96.1% | 84.3 |
| Titania/alumina control | 95.5% | 83.0 |
| High alumina/silica control | 97.3% | 85.0 |

It is claimed:

1. A process for preparing a composite pigment comprising the steps of:
    a) neutralizing sulfuric acid generated during a process for preparing titanium dioxide by the addition of a calcium compound, thereby precipitating particulate gypsum at a pH below 1.5,
    b) forming an aqueous dispersion of said particulate gypsum, milling said dispersion to reduce the particulate gypsum to an average particle size of less than 10 microns,
    c) mixing the milled gypsum with pigmentary titanium dioxide to form an aqueous dispersion of mixed particles of titanium dioxide and gypsum, and
    d) coating the mixed particles with an oxide or hydrous oxide of a metal or silicon.

2. A process according to claim 1 in which the average particle size of the particulate gypsum is reduced to less than 5 microns.

3. A process according to claim 1 in which the average particle size of the particulate gypsum is reduced to between 3 and 5 microns.

4. A process according to claim 1 in which the pigmentary titanium dioxide is rutile titanium dioxide.

5. A process according to claim 4 in which the titanium dioxide has an average crystal size of from about 0.1 to about 0.4 micron.

6. A process according to claim 1 in which the dispersion of particulate gypsum is formed in the presence of a dispersing agent selected from the group consisting of phosphates, silicates, alkanolamines and salts of a polycarboxylic acid and an alkali metal.

7. A process according to claim 6 in which the alkanolamine is monoisopropanolamine.

8. A process according to claim 6 in which the salt of a polycarboxylic acid is a sodium polycarboxylate.

9. A process according to claim 1 in which the oxide or hydrous oxide is selected from the group consisting of oxides and hydrous oxides of titanium, aluminium, silicon, cerium, zirconium, zinc, antimony and tin.

10. A process according to claim 1 in which the mixed particles are coated with an oxide or hydrous oxide in an amount of from 1 to 25 percent by weight calculated as oxide with respect to weight of particulate material.

11. A process according to claim 1 in which a mixture of oxides or hydrous oxides is coated on to the mixed particles and the mixture is selected from the group consisting of a mixture of a hydrous oxide of titanium and a hydrous oxide of aluminium and a mixture of a hydrous oxide of silicon and a hydrous oxide of aluminium.

12. A process according to claim 1 in which the dispersion of mixed particles is mixed with a hydrolysable compound of a metal or silicon and the hydrolysable compound is converted to oxide or hydrous oxide by adjustment of the pH of the dispersion.

13. A process according to claim 12 in which the hydrolysable compound is selected from the group consisting of alkali metal silicates, mixed solutions of titanyl sulphate and aluminium sulphate and alkali metal aluminates.

14. A process according to claim 1 in which the composite pigment prepared contains from about 1 to about 70 percent by weight titanium dioxide with respect to total weight of titanium dioxide and gypsum.

15. A process according to claim 14 in which the composite pigment contains from 10 to 50 percent by weight titanium dioxide with respect to total weight of titanium dioxide and gypsum.

16. A process according to claim 1 in which the dispersion is milled at a concentration up to 700 grams per liter total solids.

17. A process according to claim 16 in which the concentration of the dispersion is from 100 to 400 grams per liter total solids.

18. A process according to claim 1 in which the particulate gypsum precipitated is washed with a solution of a water-soluble phosphate.

19. A process according to claim 1 in which the composite pigment is heated to convert said particulate gypsum to anhydrite.

20. A coating composition containing the composite pigment prepared according to the process of claim 1.

* * * * *